(12) United States Patent
Rapp et al.

(10) Patent No.: US 7,624,121 B2
(45) Date of Patent: Nov. 24, 2009

(54) DATA PROCESSING SYSTEMS AND METHODS

(75) Inventors: Roman Rapp, Villeneuve Loubet (FR); Bernd Junginger, Dielheim (DE); Peter von Zimmermann, Angelbachtal (DE); Gunther Liebach, Walldorf (DE)

(73) Assignee: SAP AG, Walldorf (DE)

( * ) Notice: Subject to any disclaimer, the term of this patent is extended or adjusted under 35 U.S.C. 154(b) by 169 days.

(21) Appl. No.: 11/171,303

(22) Filed: Jul. 1, 2005

(65) Prior Publication Data

US 2006/0212458 A1 Sep. 21, 2006

(30) Foreign Application Priority Data

Mar. 18, 2005 (EP) ................................ 05005942

(51) Int. Cl.
  *G06F 7/00* (2006.01)
  *G06F 17/00* (2006.01)
(52) U.S. Cl. ................. 707/102; 705/29; 705/36 R
(58) Field of Classification Search .......... 707/1, 707/3, 6, 100; 705/1
  See application file for complete search history.

(56) References Cited

U.S. PATENT DOCUMENTS

| | | | | |
|---|---|---|---|---|
| 5,838,965 | A | | 11/1998 | Kavanagh et al. ........ 707/103 R |
| 6,505,205 | B1 | * | 1/2003 | Kothuri et al. ............... 707/100 |
| 6,694,306 | B1 | * | 2/2004 | Nishizawa et al. ............. 707/3 |
| 6,801,910 | B1 | * | 10/2004 | Bedell et al. ..................... 707/6 |
| 7,165,036 | B2 | * | 1/2007 | Kruk et al. ....................... 705/1 |
| 2004/0139045 | A1 | * | 7/2004 | Vierich et al. ................... 707/1 |
| 2004/0210445 | A1 | | 10/2004 | Veronese et al. ............... 705/1 |
| 2004/0243438 | A1 | * | 12/2004 | Mintz ............................. 705/2 |
| 2005/0010550 | A1 | * | 1/2005 | Potter et al. ..................... 707/1 |
| 2005/0027721 | A1 | | 2/2005 | Saenz ........................ 707/100 |
| 2005/0033726 | A1 | * | 2/2005 | Wu et al. ........................ 707/1 |

FOREIGN PATENT DOCUMENTS

WO    WO 00/57311 A2    9/2000

OTHER PUBLICATIONS

European Communication and Search Report, dated Aug. 3, 2005, (6 pages).

* cited by examiner

*Primary Examiner*—Neveen Abel Jalil
*Assistant Examiner*—Vei-Chung Liang
(74) *Attorney, Agent, or Firm*—Finnegan, Henderson, Farabow, Garrett & Dunner, LLP

(57) ABSTRACT

A system, method, and computer-readable medium are disclosed for data processing. An exemplary method includes coupling a plurality of data warehouses to a data processing system. Each of the data warehouses may include key figures field catalogues and characteristics field catalogues. The method may further include selecting a sub-set of the plurality of data warehouses, selecting at least one of the key figures field catalogues and characteristics field catalogues of a selected one of the data warehouses, and storing data indicative of the selected sub-set and the selected at least one key figures field catalogue and characteristics field catalogue for definition of a data domain.

16 Claims, 8 Drawing Sheets

DATA PROCESSING SYSTEMS AND METHODS

TECHNICAL FIELD

The present invention relates generally to the field of data processing and to the field of data warehouses.

BACKGROUND

Data warehouses are commonly used as the foundation of decision support systems (DSS). Typically, a data warehouse may be implemented as a data processing system that may be physically distinct from an online operational data processing system, such as an online transaction processing system (OLTP). In contrast to an OLTP that serves for the processing of operational information to support the daily operations of a business, a data warehouse may be designed for the processing of informational information for management information and/or decision support purposes.

SUMMARY

In accordance with embodiments consistent with the present invention, a data processing system may be provided comprising interface means for coupling to a plurality of data warehouses, each of the data warehouses including key figures field catalogues and characteristics field catalogues. The data processing system may further include means for selecting a sub-set of the plurality of data warehouses, means for selecting at least one of the key figures field catalogues and characteristics field catalogues of a previously selected one of the data warehouses, and means for storing data indicative of the selected sub-set and the selected at least one key figures field catalogue and characteristics field catalogue for definition of a data domain.

Embodiments of the present invention may facilitate the definition of a data domain that may span over various data warehouses. The data domain may be used to define one or more databases where each database contains a sub-set of the data contained in the data domain. A database may be used to define object types, attribute types, and/or cost component split types. These type definitions may enable a user to specify a desired level of granularity of a data drill-down analysis and the dimensions of the analysis.

Consistent with an embodiment of the present invention, a user may select a component split type by use of a graphical user interface, such as by selecting a menu item from a pull-down menu that represents a desired component split type.

Embodiments consistent with the present invention further relate to data processing methods for defining a data domain that spans multiple data warehouses. Such a data domain may be used as a foundation for the definition of one or more databases. A database may be used to define object types, attribute types, and/or component split types in order to facilitate the specification of a desired level of granularity and the dimensions of a drill-down data analysis.

Embodiments consistent with the present invention also relate to computer program products implementing such data processing methods.

Still other embodiments consistent with the invention relate to graphical user interfaces operable to receive a user's selection of a symbol being representative of an object type instance of one of the object types, and to display object type instance symbols belonging to the selected object type in response to the user's selection. The graphical user interfaces may also display key figures of the selected object type, receive a user's selection of one of the displayed key figures, and receive a user's selection of a cost component split type being assigned to the selected key figure.

Graphical user interfaces consistent with the present invention may be advantageously used by a non-expert user during the run-time of a data processing system.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
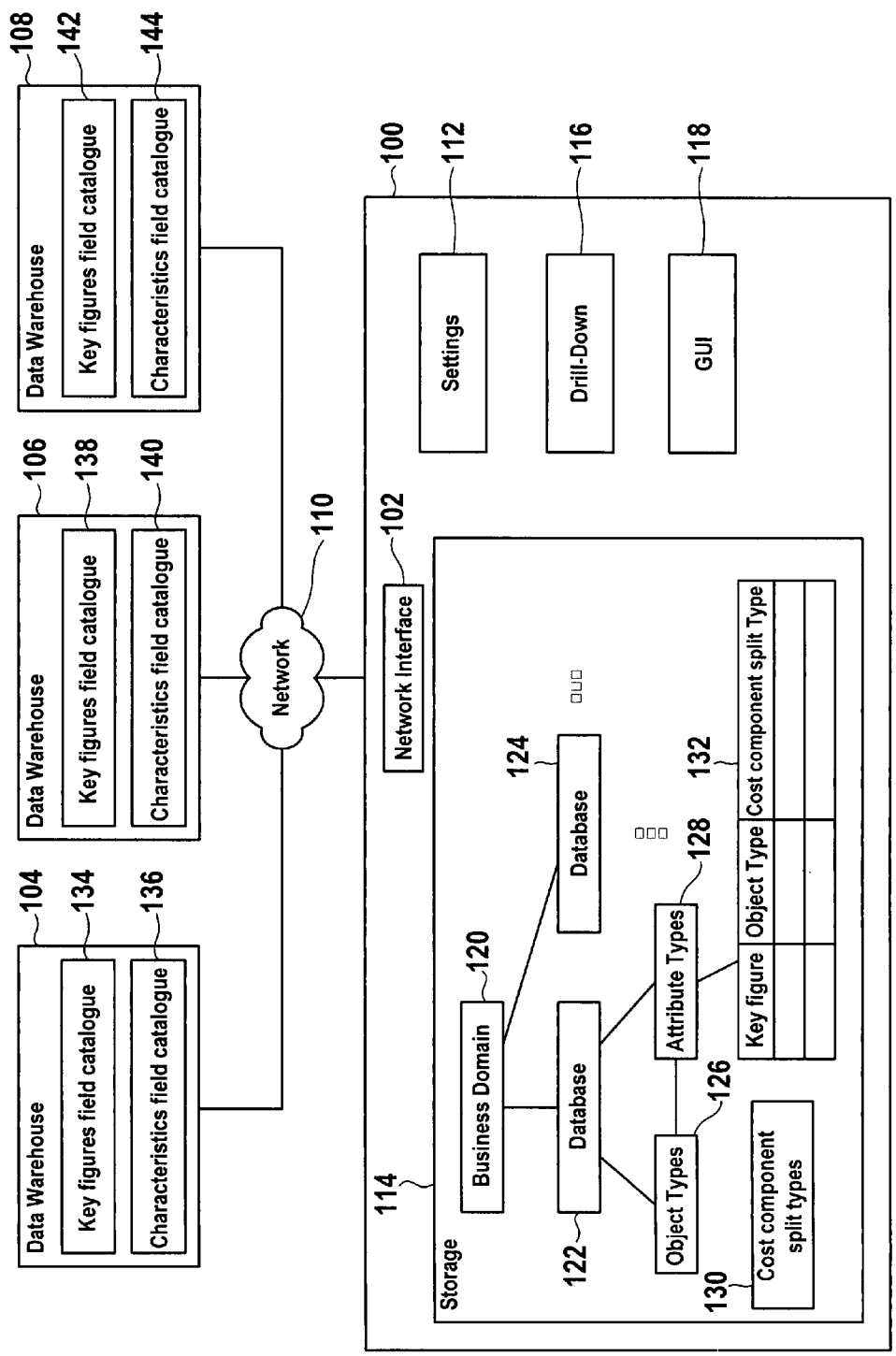
FIG. 1 is a block diagram, consistent with an embodiment of the invention, of an exemplary data processing system.

FIG. 1 illustrates an exemplary data processing system 100 comprising a network interface 102 for coupling to a plurality of data warehouses 104, 106, 108 via a network 110.

Each of the data warehouses 104, 106, 108 may have one or more key figures field catalogues and characteristics field catalogues. For example, data warehouse 104 may have a key figures field catalogue 134 and a characteristics field catalogue 136; data warehouse 108 may have a key figures field catalogue 138 and a characteristics field catalogue 140; and data warehouse 108 may have a key figures field catalogue 142 and a characteristics field catalogue 144. Each of the key figures field catalogues and characteristics field catalogues may provide a directory of key figures and characteristics, respectively, of the respective data warehouse.

Typically, key figures may be used to describe any kind of numeric information from the business process level, such as an amount, a quantity, a number, an integer, a date, a time, etc.

Characteristics may be used to describe the objects dealt within business processes. These may be anything from core business objects like customers, products, and accounts to simple attributes like color, zip codes, and status. While key figures, from a database point of view, simply describe a single field in a database table, characteristics may be more complex. The description of a characteristic may include a field description as it does for key figures, but it may also include the description of a complete set of master data tables storing attributes, text, and keys associated to that field.

The data warehouses 104, 106, 108, may be implemented by means of known software products, such as the SAP BUSINESS INFORMATION WAREHOUSE (BW) product that is commercially available from SAP AG, Walldorf, Germany.

The data processing system 100 may comprise a program component 112 for entry of settings that specify how the data warehouses 104, 106, 108 are logically linked. The resultant settings and definitions may be stored in a storage 114 of the data processing system 100.

As shown in FIG. 1, data processing system 100 may also comprise a program component 116 for drill-down analysis of data in accordance with dimensions that have been previously defined by means of program component 112. Further, data processing system 100 may comprise a graphical user interface 118 in order to facilitate a user's interaction with data processing system 100 regarding the entry of settings by means of program component 112 and/or for the purpose of performing a data analysis, such as, by means of program component 116.

Program component 112 may typically be used by an expert user, whereas the program component 116 may be used during the run-time of data processing system 100 by a non-expert user, for example, to manage information and/or support decisions.

Program component 112 may be started in order to select one of the data warehouses 104, 106, 108. One or more key figures field catalogues and characteristics field catalogues may be selected from the selected data warehouse. The selection of one or more key figures field catalogues and characteristics field catalogues may be done for each selected data warehouse of the data warehouses 104, 106, 108. The resultant set of data warehouses, key figures field catalogues and characteristics field catalogues may define the data domain that may be specific for a certain business purpose and may be thus referred to in the following as a business domain 120.

Business domain 120 may form the foundation for defining a database 122. Database 122 may specify a sub-set of the data of business domain 120. This sub-set may be defined by selecting key figures and characteristics from business domain 120. One or more additional databases 124 may be defined as sub-sets of the data covered by business domain 120.

In one embodiment, this selection process may be carried out by means of program component 112. Program component 112 may also be used to define object types 126 and attribute types 128 using the key figures and characteristics covered by database 120. Likewise, costs component split types 130 may be defined using the database 120. Cost component split types may be assigned to key figures contained in object types by means of a table 132 that may be accessed by means of program component 112. Table 132 may be related to the attribute types 128. Each of the attribute types 128 may relate to one or more object types 126.

After the entry of the definitions for the business domain 120, the database 120, 124, the object types 126, the attribute types 128, the cost component split types 130, and the table 132, the definition phase for specifying the data coverage, the granularity, and the dimensions for performing the data analysis may be completed.

When program component 116 is started, for example, to perform an analysis, a user may select one of the key figures via graphical user interface 118 and one of the cost component split types assigned to the selected key figure in the table 132. In response, the cost component split may be performed as specified by the selected cost component split type.

Figure 2:
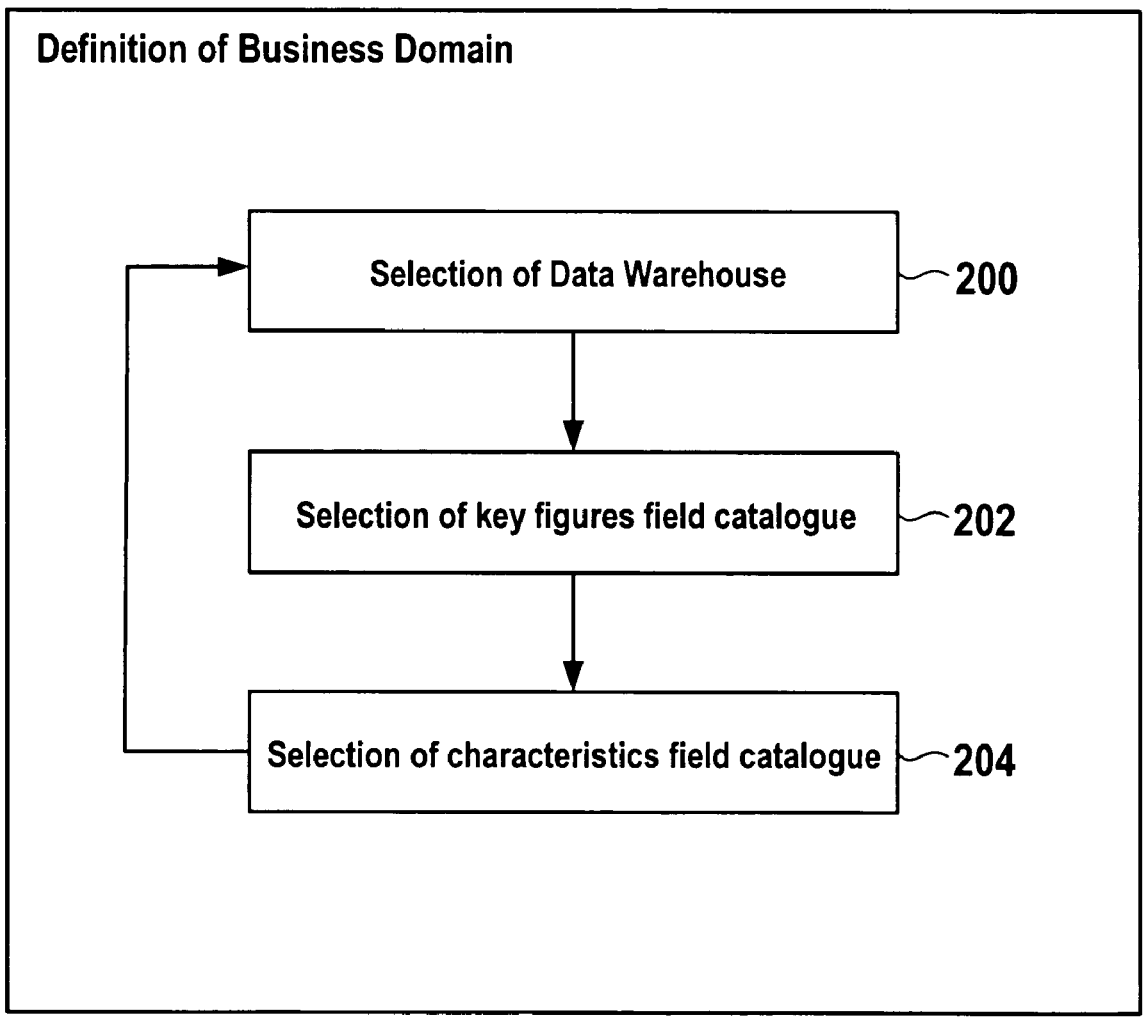
FIG. 2 is a flowchart, consistent with an embodiment of the invention, of an exemplary method for defining a business domain.

FIG. 2 shows a flowchart, consistent with an embodiment of the invention, of an exemplary method for defining business domain 120 (cf. FIG. 1). In step 200, one of the data warehouses that is coupled to the data processing system may be selected. In step 202, at least one of the key figures field catalogues of the selected data warehouse may be selected. In step 204, at least one of the characteristics field catalogues of the selected data warehouse may be selected. The selections of the data warehouse, the key figures field catalogue(s), and the characteristics field catalogue(s) may be stored in storage 114 (cf. FIG. 1) of the data processing system. After all selections of the field catalogues have been made for the selected data warehouse, steps 200 to 204 may be repeated for selection of one or more additional data warehouses and their respective field catalogues in order to complete the definition of the business domain.

Figure 3:
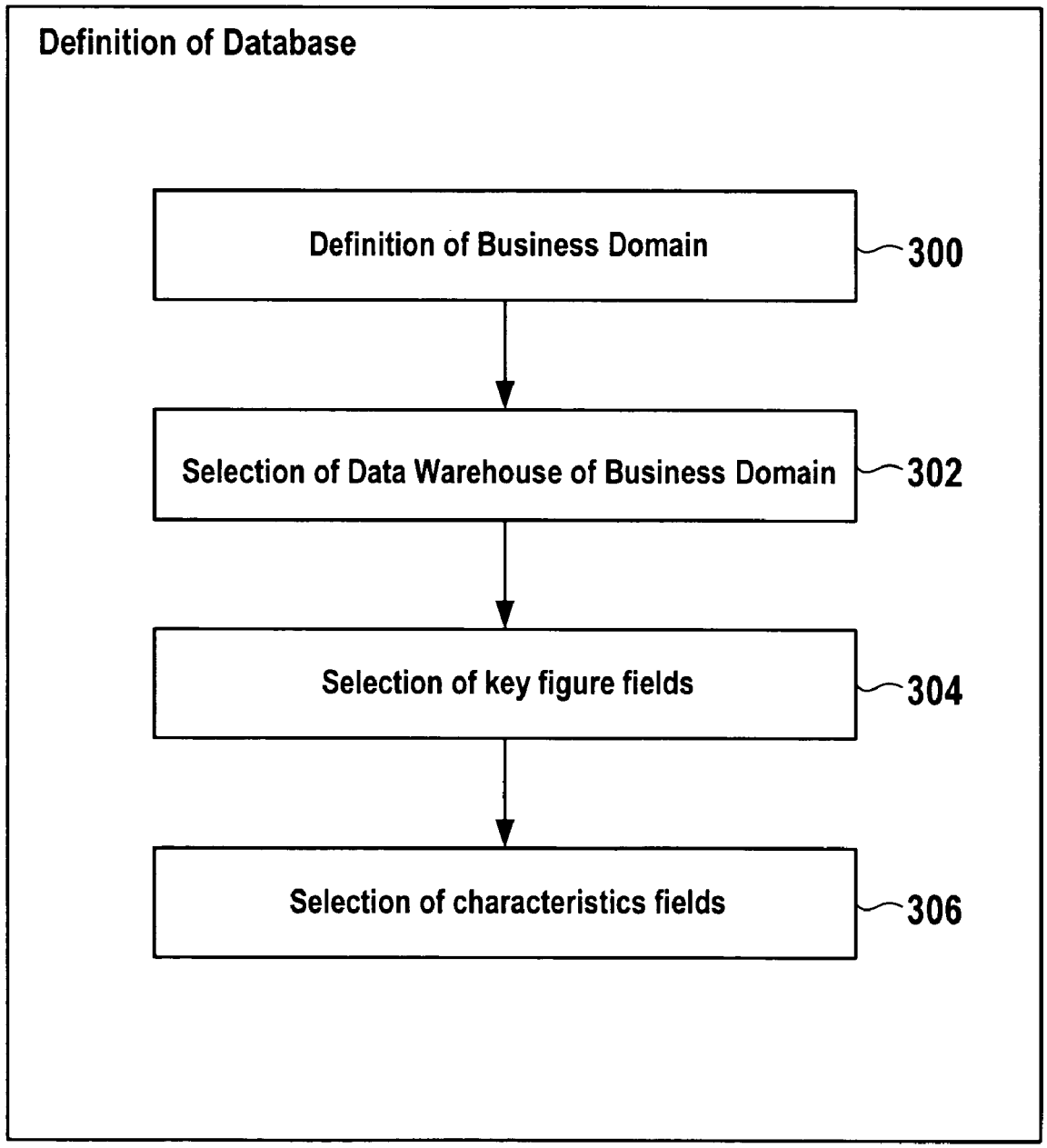
FIG. 3 is a flowchart, consistent with an embodiment of the invention, of an exemplary method for defining a database.

FIG. 3 illustrates an exemplary method for defining a database, consistent with an embodiment of the invention. For definition of a database, one of the previously defined business domains may be selected in step 300. In step 302, one of the data warehouses contained in the selected business domain may be selected. In step 304, key figure fields of the selected data warehouse may be selected and, in step 306, characteristics fields of the selected data warehouse may be selected.

Figure 4:
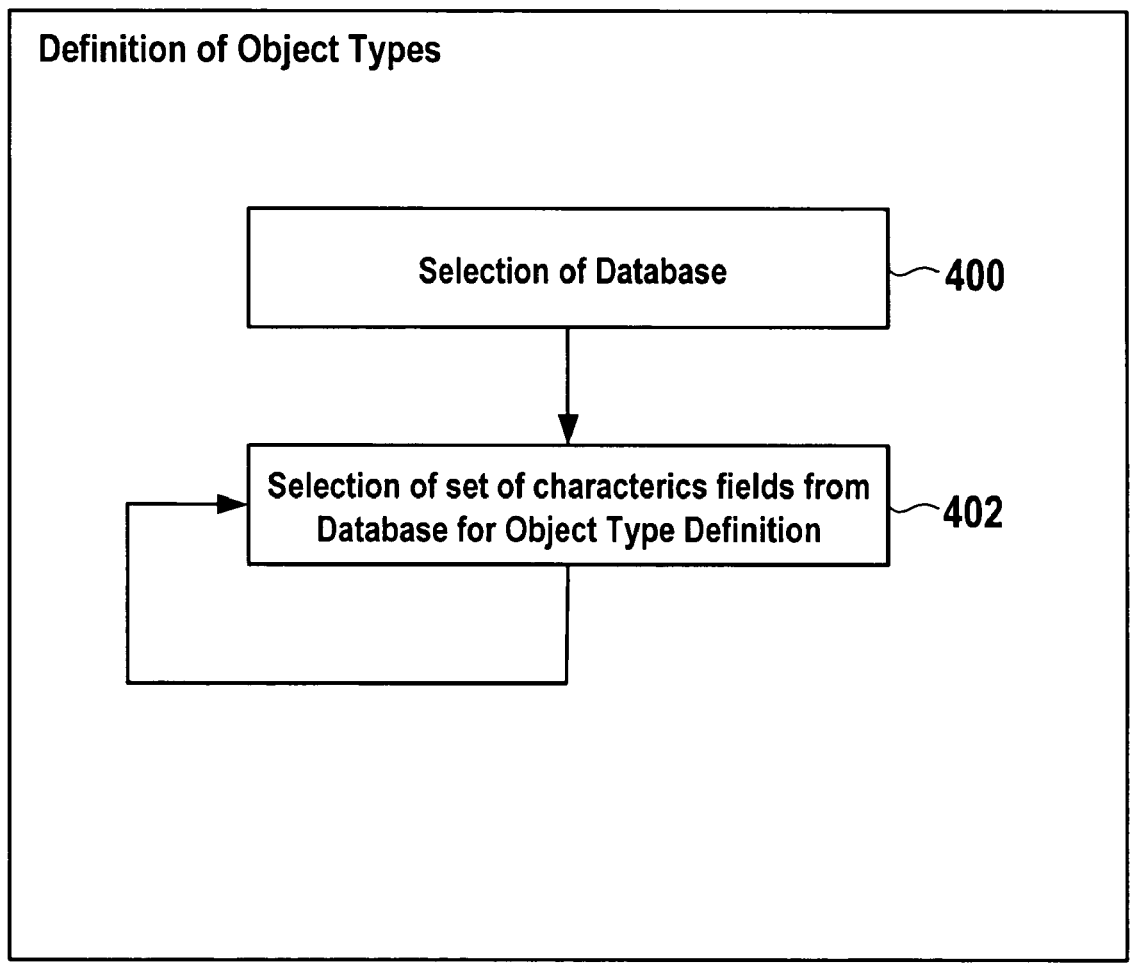
FIG. 4 is a flowchart, consistent with an embodiment of the invention, of an exemplary method for defining object types.

FIG. 4 illustrates an exemplary method for defining object types 126, consistent with an embodiment of the present invention. In step 400, a database may be selected, such as database 122 (cf. FIG. 1). In step 402, a set of characteristics fields may be selected from the selected database. This may constitute an object type definition. Step 402 may be performed for all object types to be defined.

Figure 5:
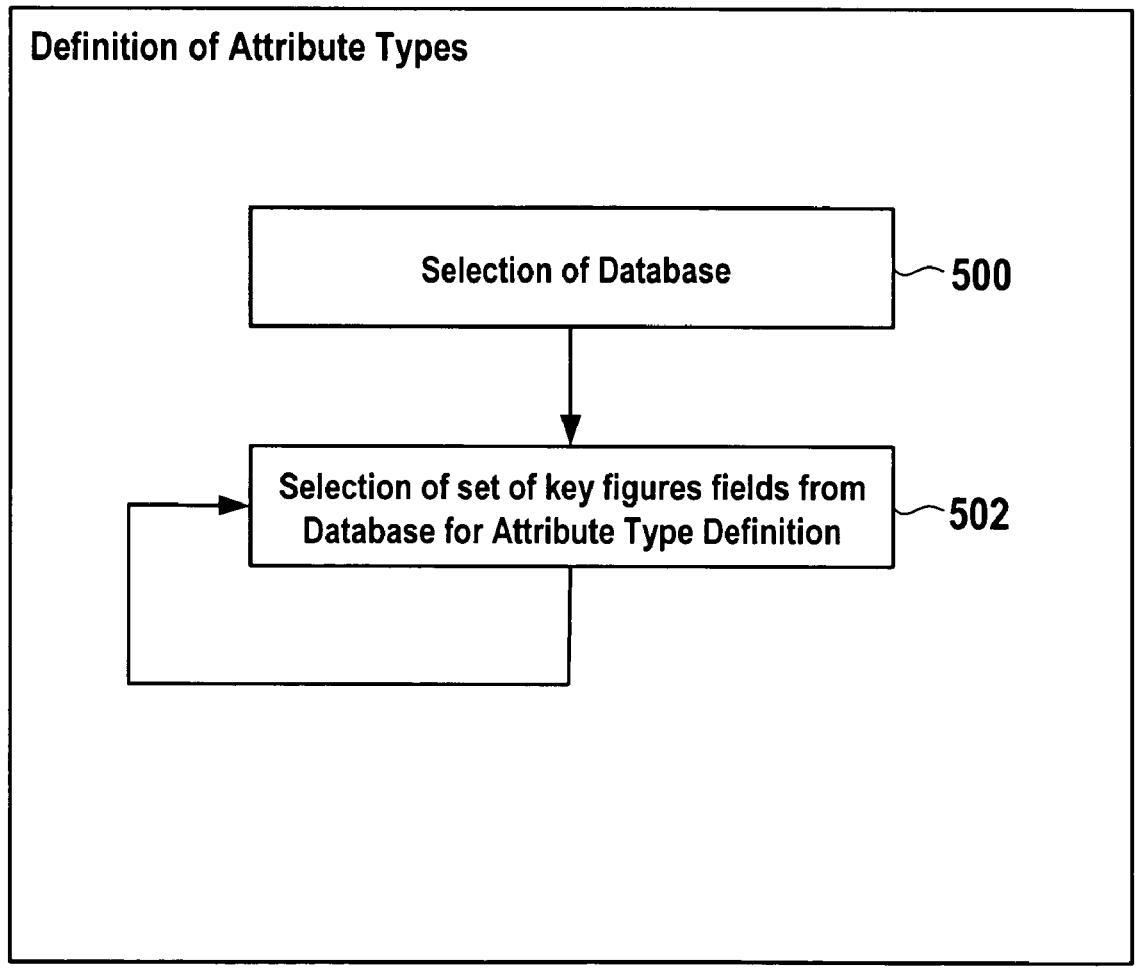
FIG. 5 is a flowchart, consistent with an embodiment of the invention, of an exemplary method for defining attribute types.

FIG. 5 illustrates an exemplary method for defining attribute types, consistent with an embodiment of the invention (cf. attribute types 128 of FIG. 1). In step 500, one of the databases may be selected, such as the database 122 (cf. FIG. 1). In step 502, a set of key figures fields may be selected from the selected database, which may constitute an attribute type definition. Step 502 may be carried out for all attribute types to be defined. An attribute type may be linked to one or more object types in order to complete the respective object types definitions.

Figure 6:
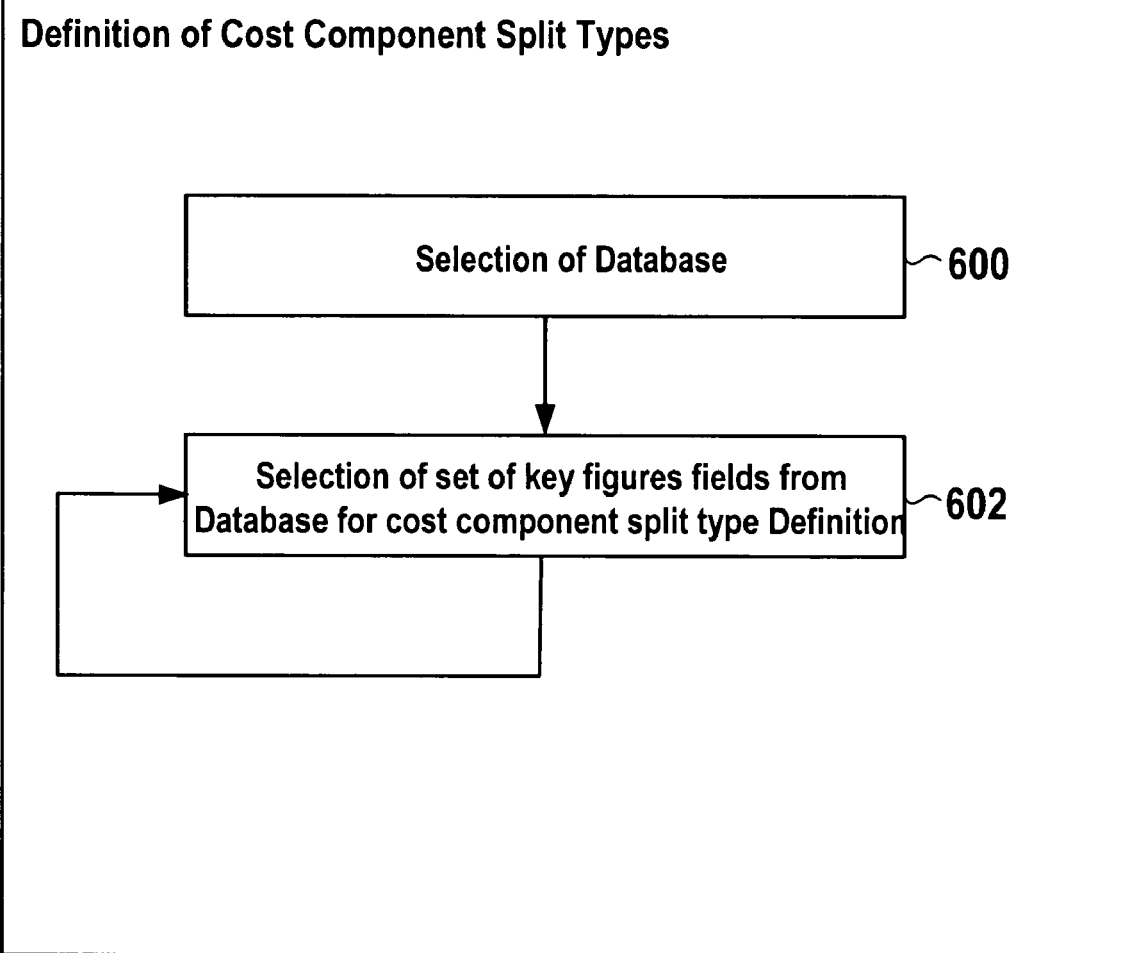
FIG. 6 is a flowchart, consistent with an embodiment of the invention, of an exemplary method for defining cost component split types.

FIG. 6 shows a flowchart, consistent with an embodiment of the invention, of an exemplary method for defining cost component split types. In step 600, one of the databases may be selected. In step 602, a set of key figures fields may be selected from the selected database which may constitute a cost component split type definition. Step 602 may be performed for each cost component split type 130 (cf. FIG. 1) to be defined.

Figure 7:
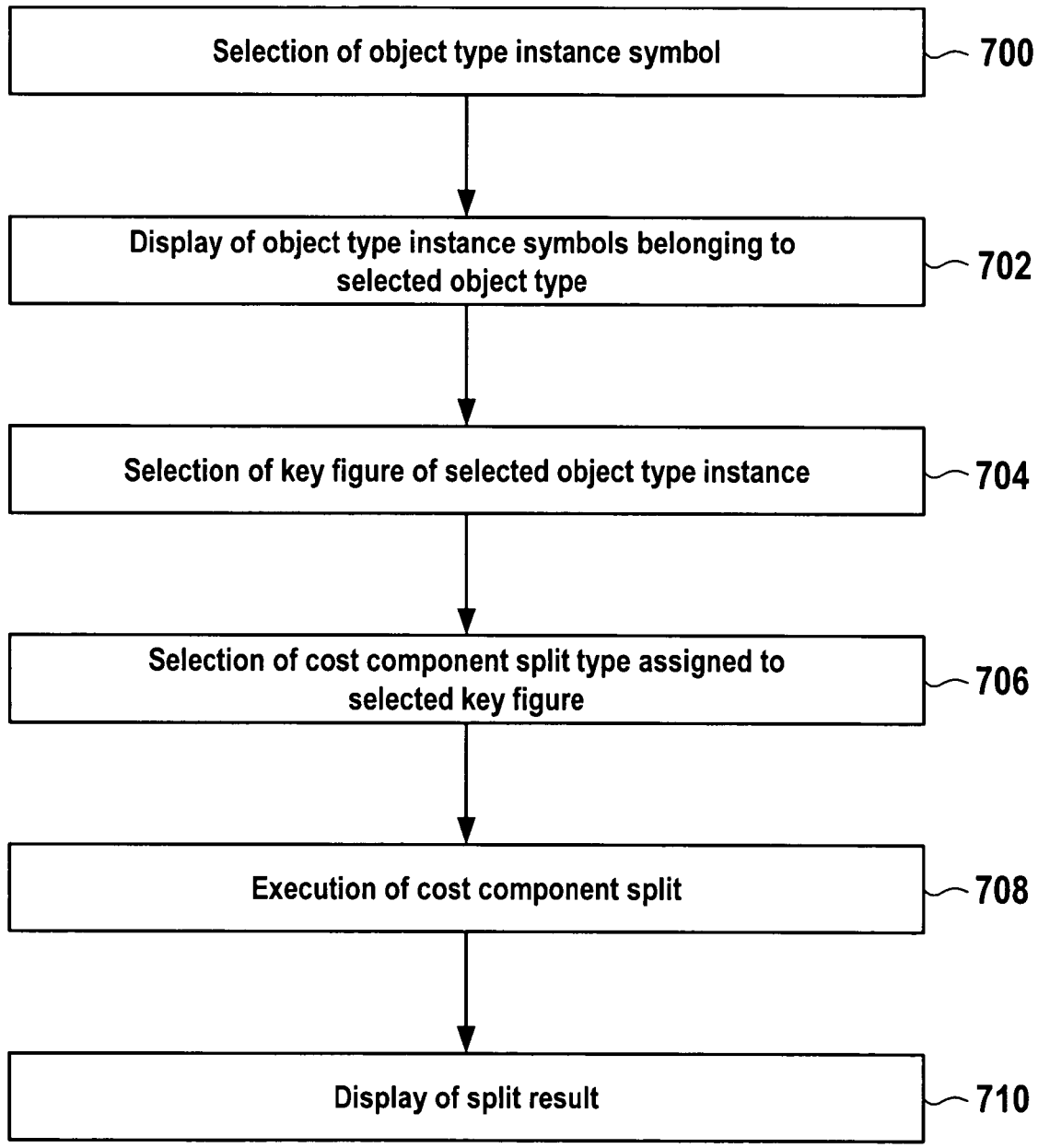
FIG. 7 is a flowchart, consistent with an embodiment of the invention, of an exemplary method for using a graphical user interface for performing a data analysis.

FIG. 7 shows a flowchart, consistent with the invention, of an exemplary method of using a data processing system after the definition phase of, for example, FIGS. 2 to 6.

In step 700, at least one symbol may be displayed on the graphical user interface that may represent an object type instance. In response to a user's selection of the object type instance symbol, the object type instance symbols that belong to the selected object type may be displayed in step 702. In step 704, a user may select one of the key figures of the object type instance selected in step 700. In step 706, the user may select one of the cost component split types that may be assigned to the key figure selected in step 704. In step 708, the cost component split may be executed and the split result may be displayed in step 710.

Figure 8:
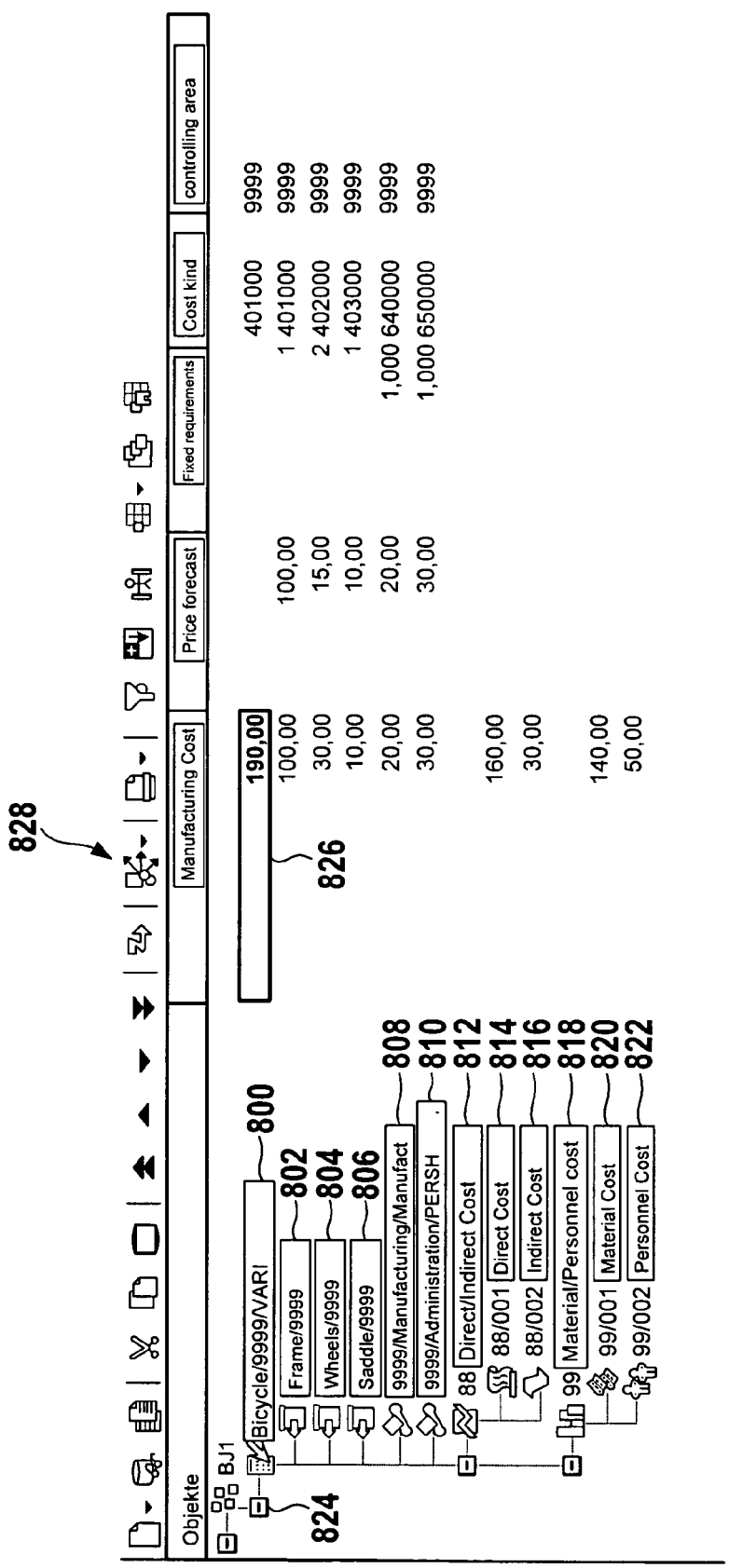
FIG. 8 illustrates, consistent with an embodiment of the invention, an exemplary window generated by a graphical user interface.

FIG. 8 illustrates an exemplary window, consistent with an embodiment of the invention, that may be generated by graphical user interface 118 (cf. FIG. 1). The window may show the performance of a data analysis in accordance with a selected cost component split type.

In FIG. 8, symbol 800 represents an instance of an object type. In the example considered here, the instance may be a "bicycle." The instance "bicycle" may consist of three materials, i.e., frame, wheels, and saddle. This may be represented by the symbols 802, 804, and 806 that represent respective object type instances.

Symbols 808 and 810 may be representative of object type instances related to non-material cost: In particular, symbol 808 may represent the instance "manufacturing cost" and symbol 810 may represent the instance "administration cost".

Symbols 802 to 810 may be displayed in the window when the user clicks on the expansion symbol 824.

These five objects 802 to 810 may be sender objects that 'send' their respective costs to the only receiver object in this exemplary model, i.e., the instance "bicycle".

For example, assume the user has selected one of the key figures of the selected object type instance, i.e., the key figure "manufacturing cost". This may be illustrated on the graphical user interface by highlighting the selected key figure, such as by means of a grey bar 826, as represented in FIG. 8.

After the selection of the key figure, the user may click on a pull-down menu icon 828. Each menu item of the pull-down menu represented by pull-down icon 828 may represent a cost component split type assigned to the selected key figure (e.g., the assignment contained in table 132 of FIG. 1). After selection of one of the cost component split types, the respective cost component split may be calculated, such as the split of direct and indirect cost, as represented by symbols 812, 814, and 816, or the split into material/personnel cost, as represented by symbols 818, 820, and 822.

Various splitting methods may be used for performing cost splitting. For setting up a splitting method, a component type may be defined. Next, the component split method itself may be defined. There may be multiple splitting methods per component type. For example, the characteristics and the rules used for the determination of a splitting method may be defined per object type.

Next, derivation characteristics may be selected that may be used to determine a splitting method for a given object of the chosen object type. Further, determination rules may be defined in order to determine one of the splitting methods.

Likewise, derivation characteristics and the corresponding rules may be defined by means of a suitable sequence of user dialogues. For example, derivation characteristics may be used to determine components of a given splitting method and derivation rules may be defined for allocations. For example, the allocated values may be assigned to different components on the receiver depending on the cost elements of the sender key figure.

To further illustrate, assume the formulas used for the cost splitting in the example shown in FIG. 8 are set-up in the following way: the 'price forecast' of the five sender objects multiplied with the 'fixed requirements' on the corresponding sender object results in the corresponding 'manufacturing cost'.

The total of the 'manufacturing cost' of the five sender objects may be, for example, 190 currency units for the bicycle.

The window also may show the 'cost kind' and 'controlling area' on each sender object. Using these two characteristics on the sender object and suitable derivation rules, the component splits may be calculated as shown in FIG. 8.

Embodiments of the present invention may facilitate aggregation via formulas. By default, the component values may be summed up to yield the aggregate value. However, an arithmetic formula editor may be used to define the aggregate value not only as a sum of its components, but as a function of any arithmetic operations on its components.

Other embodiments of the invention will be apparent to those skilled in the art from consideration of the specification and practice of the embodiments and features of the invention disclosed herein. It is intended, therefore, that the specification and embodiments be considered as exemplary only, with a true scope and spirit of the invention being indicated by the following claims.

What is claimed is:

1. A data processing system, comprising:
    a processor;
    a plurality of data warehouses, each of the data warehouses storing key figures field catalogues and characteristics field catalogues;
    means for selecting a sub-set of the plurality of data warehouses;
    means for selecting at least one of the key figures field catalogues and characteristics field catalogues of a selected one of the data warehouses;
    means for storing data indicative of the selected sub-set and the selected at least one key figures field catalogue and characteristics field catalogue for definition of a data domain;
    means for selecting a plurality of key figures fields and characteristics fields of the data domain contained in the at least one key figures field catalogue and characteristics field catalogue of the data domain to define a database of the data domain;
    means for receiving cost component split type definitions for an object type comprising selected key figures fields of the selected at least one key figures field catalogue of the database, wherein the cost component split definitions provide one or more methods for splitting costs for an object of the object type;
    means for receiving a user's selection of one of key figures of the object type;
    means for receiving a user's selection of a cost component split type assigned to the selected key figure, wherein the means for receiving the user's selection of the cost component split type comprises a pull-down menu, where each menu item of the pull-down menu is indicative of one of the cost component split types assigned to the selected key figure; and
    means for assigning a selected cost component split type to one of the key figures fields.

2. The data processing system of claim 1, further comprising means for entering object type definitions comprising selected characteristics fields contained in the at least one characteristics field catalogue of the database.

3. The data processing system of claim 2, further comprising:

means for receiving a user's selection of a symbol representative of an object type instance of one of the object types;

means for displaying object type instance symbols belonging to the selected object type in response to the user's selection; and means for displaying the key figures of the selected object type.

4. The data processing system of claim 1, wherein the key figures fields contain numeric information, wherein characteristic fields contain information describing an object dealt within a business process, and wherein the cost component split type definitions define at least one of split between direct and indirect costs, and split between material and personnel costs.

5. The data processing system of claim 1, further comprising:

means for entering attribute type definitions comprising selected key figures fields of the at least one key figures field catalogue of the database; and means for assigning a selected attribute type to a selected object type.

6. The data processing system of claim 1, wherein the data domain is defined for a specific business purpose.

7. A data processing method, comprising:

coupling a plurality of data warehouses to a data processing system, each of the data warehouses including key figures field catalogues and characteristics field catalogues;

selecting a sub-set of the plurality of data warehouses;

selecting at least one of the key figures field catalogues and characteristics field catalogues of a selected one of the data warehouses;

storing data indicative of the selected sub-set and the selected at least one key figures field catalogue and characteristics field catalogue;

creating a data domain using the stored data;

selecting a plurality of key figures fields and characteristics fields of the data domain contained in the at least one key figures field catalogue and characteristics field catalogue of the data domain to define a database of the data domain;

entering cost component split type definitions for an object type comprising selected key figures fields of the selected at least one key figures field catalogue of the database, wherein the cost component split definitions provide one or more methods for splitting costs for an object of the object type; and assigning a selected cost component split type to one of the key figures fields.

8. The data processing method of claim 7, further comprising entering object type definitions comprising selected characteristics fields contained in the at least one characteristics field catalogue of the database.

9. The data processing method of claim 8, further comprising:

selecting a symbol representative of an object type instance of one of the object types;

displaying object type instance symbols belonging to the selected object type in response to the user's selection;

displaying key figures of the selected object type;

selecting one of the displayed key figures; and selecting a cost component split type assigned to the selected key figure.

10. The data processing system of claim 9, wherein selecting a cost component split type comprises providing a pull-down menu, where each menu item of the pull-down menu is indicative of one of the cost component split types assigned to the selected key figure.

11. The data processing method of claim 7, wherein the key figures fields contain numeric information, wherein characteristic fields contain information describing an object dealt within a business process, and wherein the cost component split type definitions define at least one of split between direct and indirect costs, and split between material and personnel costs.

12. The data processing method of claim 7, further comprising:

entering attribute type definitions comprising selected key figures fields of the at least one key figures field catalogue of the database; and assigning a selected attribute type to a selected object type.

13. A computer readable storage medium storing a program for causing a computer to perform a method for processing data, the method comprising:

coupling a plurality of data warehouses to a data processing system, each of the data warehouses comprising key figures field catalogues and characteristics field catalogues;

selecting a sub-set of the plurality of data warehouses;

selecting at least one of the key figures field catalogues and characteristics field catalogues of a selected one of the data warehouses; and storing data indicative of the selected sub-set and the selected at least one key figures field catalogue and characteristics field catalogue for definition of a data domain;

selecting a plurality of key figures fields and characteristics fields of the data domain contained in the at least one key figures field catalogue and characteristics field catalogue of the data domain to define a database of the data domain;

entering cost component split type definitions for an object type comprising selected key figures fields of the selected at least one key figures field catalogue of the database, wherein the cost component split definitions provide one or more methods for splitting costs for an object of the object type; and assigning a selected cost component split type to one of the key figures fields.

14. The computer-readable storage medium of claim 13, wherein the key figures fields contain numeric information, wherein characteristic fields contain information describing an object dealt within a business process, and wherein the cost component split type definitions define at least one of split between direct and indirect costs, and split between material and personnel costs.

15. The computer-readable storage medium of claim 13, wherein the method further comprises:

entering attribute type definitions comprising selected key figures fields of the at least one key figures field catalogue of the database; and assigning a selected attribute type to a selected object type.

16. A computer-readable storage medium storing a program for causing a computer to perform a method for generating a graphical user interface, the method comprising:

receiving of a user's selection of a symbol representative of an object type instance of one of a plurality of object types;

displaying object type instance symbols belonging to the selected object type in response to the user's selection;

displaying key figures of the selected object type;

receiving a user's selection of at least one of the displayed key figures;

receiving a user's selection of cost component split type definitions for the selected object type comprising selected key figures fields, wherein the cost component split definitions provide one or more methods for splitting costs for an object of the object type;

displaying a pull-down menu, where each menu item of the pull-down menu is indicative of one of the cost component split types assigned to the selected key figure; and receiving a user's selection of the cost component split type assigned to the selected key figure.

* * * * *